United States Patent [19]

Soliday et al.

[11] Patent Number: 5,680,262
[45] Date of Patent: Oct. 21, 1997

[54] STRETCHED MEMBRANE MIRROR AND METHOD OF MAKING SAME

[75] Inventors: Patrick K. Soliday; Gary W. Thomas; Monte A. McGlaun; Michael J. Taylor, all of Abilene, Tex.

[73] Assignee: Cummins Power Generation, Inc., Columbus, Ind.

[21] Appl. No.: 452,410

[22] Filed: May 26, 1995

Related U.S. Application Data

[62] Division of Ser. No. 17,700, Feb. 12, 1993.

[51] Int. Cl.⁶ .............................. G02B 5/08; G02B 7/188
[52] U.S. Cl. ........................... 359/840; 359/846; 359/847
[58] Field of Search ........................... 359/840, 846, 359/847, 849, 883

[56] References Cited

U.S. PATENT DOCUMENTS

| | | |
|---|---|---|
| 1,529,292 | 3/1925 | Benford . |
| 3,429,006 | 2/1969 | Mattimoe et al. . |
| 3,610,738 | 10/1971 | Bochmann . |
| 3,623,793 | 11/1971 | Merten et al. . |
| 3,623,796 | 11/1971 | Schweiger . |
| 3,878,010 | 4/1975 | Zammit . |
| 3,880,500 | 4/1975 | Kojabashian . |
| 4,029,532 | 6/1977 | Warhol et al. . |
| 4,033,676 | 7/1977 | Brantley, Jr. et al. .................. 359/847 |
| 4,051,286 | 9/1977 | Abbott . |
| 4,090,205 | 5/1978 | Warhol . |
| 4,097,126 | 6/1978 | Mahlein et al. ........................ 359/847 |
| 4,288,146 | 9/1981 | Johnson, Jr. et al. .................. 359/847 |
| 4,682,865 | 7/1987 | Rogers et al. . |
| 4,978,414 | 12/1990 | Ohtani et al. . |
| 5,016,998 | 5/1991 | Butler et al. ........................... 359/847 |
| 5,210,654 | 5/1993 | Williams ............................... 359/846 |

OTHER PUBLICATIONS

*Journal of Applied Polymer Science*, vol. 23, 3205–3217 (1979), entitled "Anistropy and Dimensional Stability of Biaxially Oriented Poly(ethylene Terephthalate) Films", by Bruce F. Blumentritt, IBM General Systems Division, Rochester, Minnesota 55901.

*Journal of Solar Energy Engineering*, vol. 108, 232–233 (Aug. 1986), entitled "Stretched Membrane Heliostat Technology", by L. M. Murphy, Solar Energy Research Institute, Golden, Colorado 80401.

*Primary Examiner*—Ricky D. Shafer
*Attorney, Agent, or Firm*—Woodard, Emhardt, Naughton, Moriarty & McNett

[57] ABSTRACT

A method of fabricating a reflective stretched membrane mirror for use in the collection and focusing of solar energy includes a tensioning fixture to which a plurality of air-actuated cylinders are attached. The piston arm of each cylinder is in turn connected to an air-actuated clamp which is designed to hold a portion of the peripheral edge of the reflective film which is to be stretched. Depending upon the properties of the film and its tensioning characteristics, cylinders which need the same air pressure are connected in common to a single regulator. The regulators are then connected to an air compressor and the sheet of reflective film is tensioned to a desired level at which point it is adhesively bonded to a circular frame. Once a first reflective film is bonded to a top side of the frame, the process is repeated with a second reflective film bonded to the back or opposite side of the frame. Once both reflective films have been securely bonded to the frame surfaces, a vacuum is pulled on the interior space so as to create a parabolic contour in the film.

3 Claims, 9 Drawing Sheets

STRETCHED MEMBRANE MIRROR AND METHOD OF MAKING SAME

This application is a division of application Ser. No. 08/017,700, filed Feb. 12, 1993, pending.

BACKGROUND OF THE INVENTION

The present invention relates in general to the construction of a stretched membrane mirror and to the method of manufacturing such a mirror. More particularly the present invention relates to the use of interconnected air actuated cylinders in order to uniformly distribute the tension across the surface of the membrane. While the primary application of the present invention is as a parabolic reflector for focusing solar energy on a receiver to convert the solar energy to electricity, the teachings of the present invention are not limited to this application.

In the context of the present invention, a stretched membrane mirror consists of a reflective film attached to both sides of a frame which can then be deformed by the application of a vacuum in order to obtain a parabolic reflective surface. It has been shown that the amount and even distribution of tension in the film in the "flat state" is critical in the forming of the parabolic surface.

Earlier methods of manufacture have consisted of mounting the film in a fixture which has then been placed on the frame. Weights were then placed on the fixture which would cause the film to stretch over the frame. This fabrication process would produce inconsistent and uneven tension in the film besides distorting the frame under the force of the weights. There also appeared to be a practical limit to the tension that could be obtained in this way. The higher tensions required for an accurate parabolic surface could not be obtained with this process. Because of the nature of this method, it was typical for only one side or face of the mirror frame to be fabricated at a time. This method caused the mirror frame to be distorted or "potato chipped" when the fixturing device was removed, due to unequal forces on opposite surfaces of the frame.

After the film was stretched over the frame it would be sonic welded to a plastic insert in the frame to complete the process of film attachment. The process of sonic welding would sometimes damage the reflective surface causing a loss of the natural U.V. protection which is a critical factor for any outdoor use. As a consequence of this process, a tape would have to be applied to the edge of the film for U.V. protection. The tape protected the film not only from damage done to the film by the sonic welding processes, but also the edge of the film which is unmetallized. The process of sonic welding would also induce damage to the film structure caused by crystallization of the film polymer as a result of the elevated temperatures experienced during sonic welding.

In order to resolve these problems in manufacturing, a new technique according to the present invention has been developed. The present invention consists of a method to obtain high and consistent tension in the film and also provides for film edge protection in an innovative way. The section or panel of film that is to be attached to the circular mirror frame is gripped along nearly the entire perimeter by a series of individual pneumatic clamping assemblies. These assemblies are attached to air-actuated cylinders which are anchored to an outer support frame. Once the film is gripped by the pneumatic clamping assemblies, air pressure is applied to the air-actuated cylinders which in turn begin to place tension on the film. Since the air cylinders are interconnected, either with all other cylinders or with selected groups or pairs of cylinders, tension is evenly distributed at each of the clamps for each of the groups or pairs of interconnected air cylinders. Once the correct air pressure for the desired tension is determined for each air-actuated cylinder, repetitive tensioning of successive mirrors is performed by merely opening a valve from the corresponding regulator associated with each cylinder where that corresponding regulator is preset to the correct air pressure.

The pretension film is then bonded to the mirror frame by a two-part adhesive system. The first adhesive is a structural type that is designed for the long term. This type of adhesive typically has a cure time of several hours. The second adhesive is typically a cyanoacrylate type which is designed to immediately bond the film to the mirror frame in order to permit the quick removal of the film tensioning device so that it may be used to stretch and mount more film. The cyanoacrylate adhesive holds the film firmly to the mirror frame throughout the curing process of the structural adhesive. Before the film tensioner is removed and subsequent forces are applied to the mirror frame, the fabrication process is repeated for the opposite side. After the film is attached to both sides of the mirror frame, the tensioning devices can then be removed. Film edge protection is achieved by tucking the trimmed edge of the film into a groove in the mirror frame. This groove is then filled with a bead of silicone based sealant to complete the process.

In one arrangement of the film and mirror frame, the structural adhesive may be applied after the quick-set adhesive. This option is available when the structural adhesive is located on the mirror frame radially outwardly of the location of the quick-set (cyanoacrylate) adhesive. In practice the edge of the film which is not yet bonded to the mirror frame is lifted and an amount of structural adhesive is injected beneath the lifted edge of the film. If the film edge is to be located within a receiving groove or channel in the mirror frame, the next step is to locate the film edge in the groove. After the structural adhesive is cured, a final silicone sealant is applied to fill the groove.

Since a significant aspect of the present invention is the manufacturing method, it may be of interest to consider other manufacturing methods associated with the forming and shaping of flexible materials. Consider for example the following patent references:

| | | |
|---|---|---|
| 3,429,006 | Mattimoe et al. | Feb. 25, 1969 |
| 3,878,010 | Zammit | Apr. 15, 1975 |
| 4,029,532 | Warhol et al. | June 14, 1977 |
| 4,490,205 | Warhol | Dec. 25, 1984 |
| 4,682,865 | Rogers et al. | Jul. 28, 1987 |

Mattimoe discloses an apparatus for shaping a thermoplastic sheet for use in a curved laminated glass unit. Disclosed specifically is an automobile front windshield and the apparatus for shaping this member is a rectangular frame with moveable linkages and clamping means to hold onto the edges of the thermoplastic sheet.

Zammit discloses an apparatus and method for adhesively bonding a roof covering to an automobile vehicle roof. This apparatus also includes a fixturing frame involving a number of clamping devices. The apparatus also utilizes a female mold to which a vacuum is supplied in order to hold the roof covering in the configuration of the roof as the covering is moved over the roof during the bonding operation.

The '532 Warhol patent discloses a method of reshaping a flexible precut piece of vinyl or other flexible plastic and the processing of such a piece to form a stiffened preshaped assembly.

The '205 Warhol patent discloses an apparatus and method for shaping flexible material on a form. The flexible material is treated with a thermosetting composition and then applied to an automobile roof top form. Pneumatic tensioning means are attached to the edges of the material at a plurality of spaced-apart points to tension it over the form to a predetermined orientation and shape while maintaining the forces on the material substantially in equilibrium. The material is heated in order to set the thermosetting composition. Clamping means lightly engage the material to hold it in the predetermined shape until the setting temperature is reached and then firmly engage it to form marginal flanges thereon.

Rogers discloses a concave mirror apparatus and method of construction. This device includes a mirror having first, second, and third elongated strip portions in substantially parallel relationship to each other and spaced from each other with the third elongated strip portion located between the first and second elongated strip portions. The mirror is mounted on a mounting apparatus comprising first and second members for supporting the mirror along the first and second elongated strip portions, respectively.

Neither the fabrication method acknowledged by the inventors as already existing nor any of the fabrication methods disclosed in the above-listed patents involve the formation of a stretched membrane mirror by an arrangement of air-actuated cylinder groups which are interconnected and independently controlled by an air pressure regulator so that the tension across the entire surface of the reflective film will be the same. None of the described fabrication methods which are known to exist involve an application of the reflective film on both sides of the mirror frame so that a vacuum can be pulled in order to create a desired parabolic shape.

Further, the present invention recognizes that the film which is presently used is formed by an extrusion process and biaxial orientation and will stretch to different degrees under the same tension depending upon the anisotropy in film properties. There may be differences in the required stretching force for a uniform tension throughout depending upon whether the direction of stretch or tensioning is parallel (i.e., length) to the direction of extrusion or transverse (i.e., width) to the direction of extrusion. One theory suggests more of an elliptical pattern as well as an effect depending on where the panel of film was taken from the larger extruded roll. The use of different regulator networks accommodate these particular film characteristics even when a disk or circular panel of film is cut from the roll of extruded film.

SUMMARY OF THE INVENTION

A method of fabricating a stretched membrane mirror according to one embodiment of the present invention comprises the steps of providing a mirror frame, providing a sheet of reflective film, attaching a plurality of clamps to and around the periphery of the sheet of reflective film, connecting one each of a plurality of pneumatic cylinders to each of the plurality of clamps, connecting these cylinders to one of a plurality of pneumatic sources, actuating the cylinders for pulling the sheet of reflective film into tension across its entire surface and securing the tensioned sheet of reflective film to the mirror frame. The next step according to the present invention is to repeat the process for the opposite side of the mirror frame and to then pull a vacuum between the two sheets of reflective film so as to create a parabolic reflective surface.

DESCRIPTION OF THE PREFERRED EMBODIMENT

Figure 1:
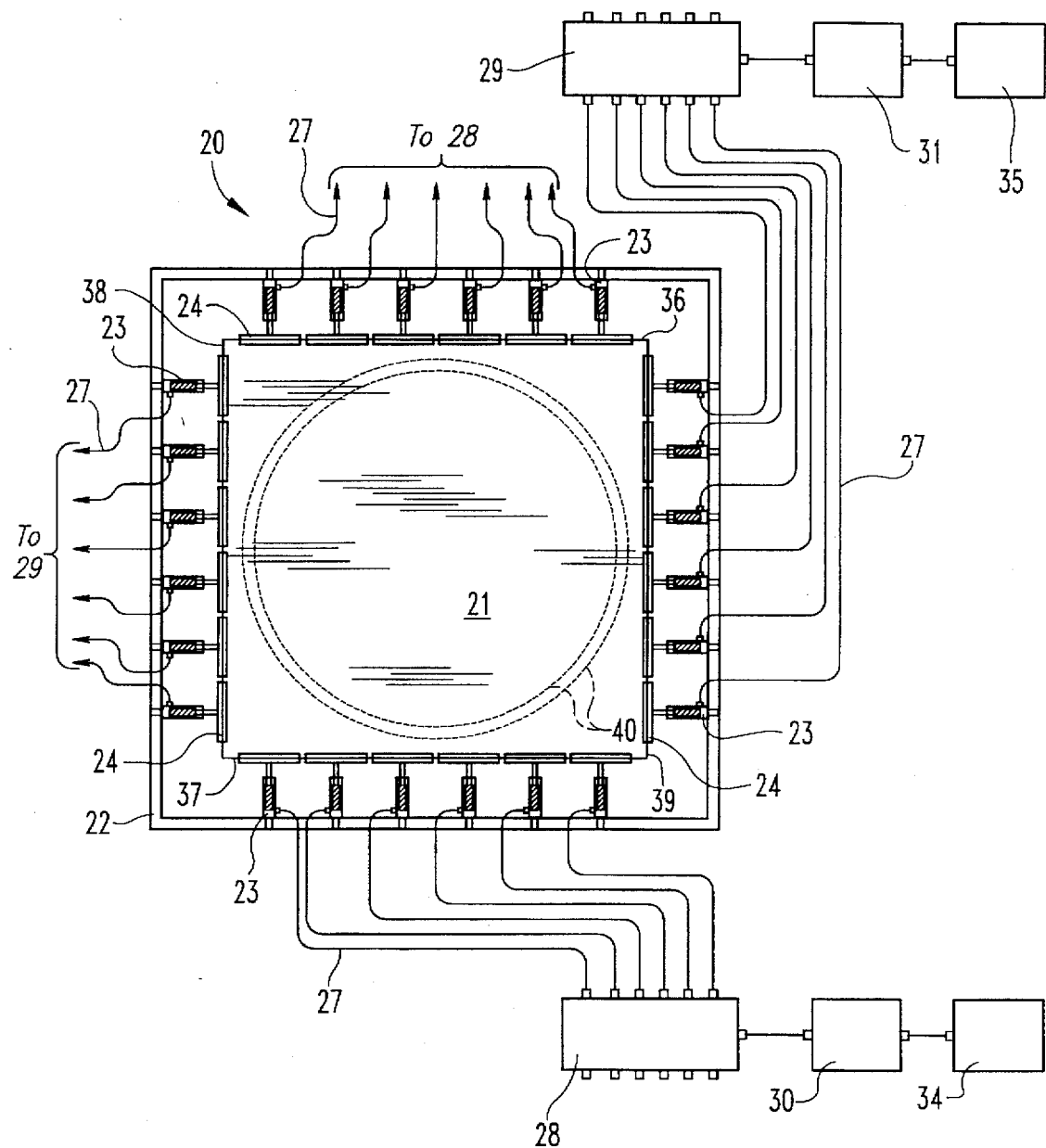
FIG. 1 is a top plan schematic view of a film tensioning fixture according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
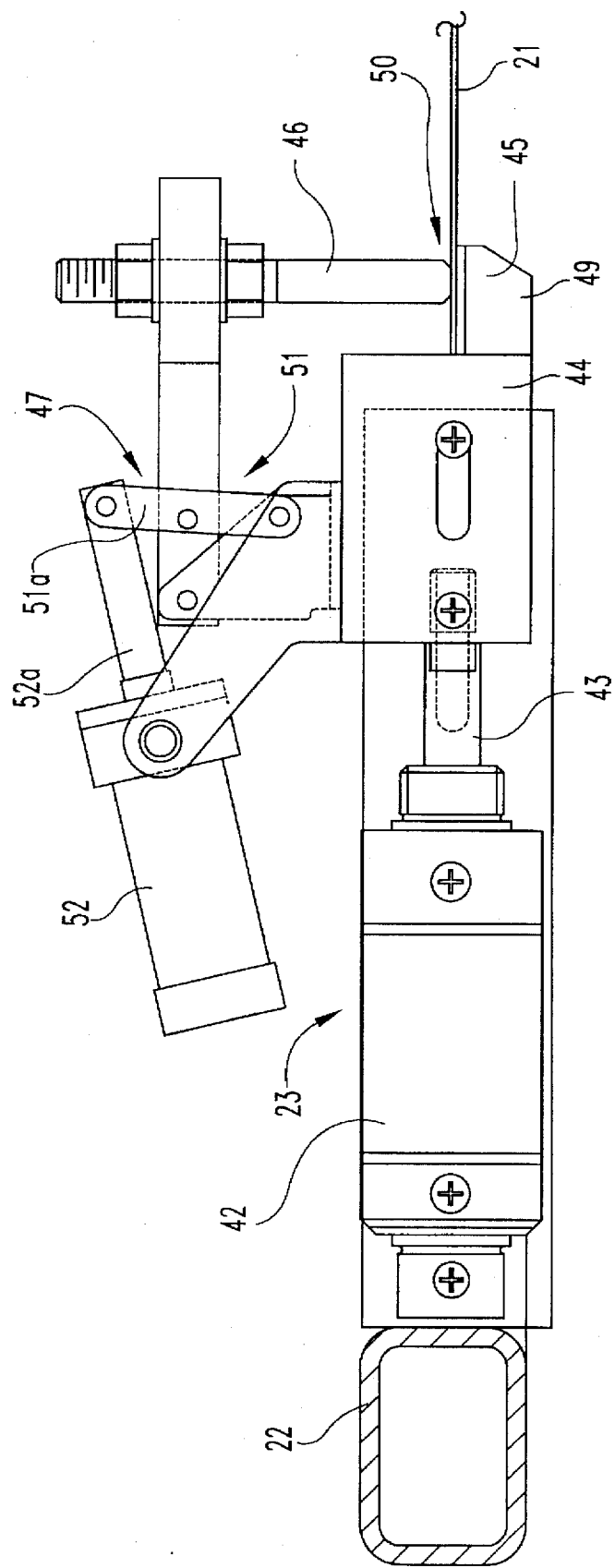
FIG. 2 is a perspective view of a clamping assembly a plurality of which are used in the FIG. 1 film tensioning fixture.

Referring to FIG. 1 there is illustrated a tensioning fixture 20 for stretching film 21 in order to create a circular stretched membrane mirror with a parabolic reflective surface according to the present invention. Fixture 20 includes a generally rectangular frame 22 to which four series of air-actuated cylinders 23 are attached. Frame 22 is an assembly of rigid sections which may, as one example, be extruded aluminum sections. Each of the air-actuated cylinders 23 is also attached to a corresponding air-actuated clamp assembly 24. Each clamp assembly 24 is only schematically represented in FIG. 1 while its detailed structure is illustrated in FIG. 2. Each clamp assembly 24 is designed to be able to securely grip a peripheral edge portion of film 21 by means of a pneumatic cylinder and linkage arrangement. When the air cylinders 23 are actuated the clamp assemblies 24 are drawn toward the frame 22. In turn the film is pulled in four different directions (based on the FIG. 1 frame style) thereby creating a uniform tension in the film and stretching it to a desired tension level.

As illustrated, film 21 as applied to the frame 22 is free of any aperture or openings extending through the film 21.

One half of the air cylinders are connected by corresponding air lines 27 to a first manifold 28 and the other half of the air cylinders are similarly connected by corresponding air lines 27 to a second manifold 29. First manifold 28 is in turn operably connected to a first regulator 30 and second manifold 29 is operably connected to a second regulator 31.

The two regulators 30 and 31 are illustrated as being operably connected to different air compressors 34 and 35, respectively. However, a single air compressor can be used assuming it has the requisite capacity to maintain the desired air pressure at both regulators. The regulators 30 and 31 control the air pressure which is seen by the corresponding group of air cylinders 23. While it might be envisioned to use a single regulator, there is a unique aspect associated with various PET films such as is used for reflective film 21. Due to certain physical properties inherent within this type of reflective film, two or more regulators are normally required in order to accurately and repeatably establish a uniform tension throughout the surface of the reflective film.

Film 21 is presently manufactured by an extrusion process and during the manufacture it is subsequently stretched in the machine direction and in the transverse or cross-web direction in a process called "biaxial orientation". The "machine direction" refers to the direction the film comes off the roll. The "transverse" or "cross-web" direction refers to the width direction. The result of this extrusion or biaxial orientation process of manufacturing the reflective film is the creation of irregularities in the film properties which reveal themselves during the film tensioning. The anisotropy now inherent in the film must be compensated for by applying a higher tension in the transverse direction than in the machine direction by a ratio of 1.2 to 1 to as much as 1.5 to 1 depending on the thickness of the film.

One theory as to the anisotropy in mechanical properties, expansion coefficients, and long-term shrinkage of PET films has been published by Bruce F. Blumentritt in the *Journal of Applied Polymer Science*, Vol 23, 3205–3217 (1979), published by John Wiley & Sons, Inc. In the article the author describes that PET film is produced commercially by extrusion of a polymer melt. Orientation involves drawing of the film in the machine direction and in the transverse direction. The drawing operation causes orientation of both crystalline and noncrystalline regions of the film which in turn determines the properties of the film and the anisotropy in the properties. This theory is addressed hereinafter and applied for the embodiment of FIG. 12.

The desire is to have uniform tension throughout the surface area of the film and ideally this could be created by providing the same air pressure to each air cylinder 23. However due to the anisotropy in the film properties resulting from the extrusion process, the air pressure to air cylinders clamped along film edges 36 and 37 must be greater than the air pressure delivered to the air cylinders clamped along film edges 38 and 39. For a 4 mil thickness of film 21 it has been found that giving a 13.8N/cm tension in the machine direction and a 20.6N/cm tension in the transverse direction gives excellent results. For this reason two separate pressure regulators are required. As far as the pressure which is delivered to the two different groups of air cylinders, it depends upon the size of the air cylinders. For cylinders with a 2 inch bore, the pressure in the machine direction cylinders is 20 psi and in the transverse direction cylinders the pressure is 30 psi, i.e., the aforementioned 3:2 ratio, in order to obtain the mentioned tensions.

It is to be understood that frame 22 may be configured with a hinge arrangement attached to a superstructure support in order to allow the frame and stretched film to be lifted and lowered onto the circular mirror frame (denoted by lines 40 in FIG. 1). Film support members may also be disposed within frame 22 and beneath film 21 without changing the remainder of the FIG. 1 structure.

Referring to FIG. 2 the typical clamping arrangement of the clamp assemblies 24 to the edges of film 21 is illustrated in greater detail. Also illustrated is the manner of connecting each air cylinder 23 to its corresponding clamp assembly 24 and to rectangular frame 22. As illustrated the body or housing 42 of the air cylinder 23 is securely attached to the rectangular frame 22. The piston arm 43 of the cylinder is attached to the bracket frame 44 of clamp assembly 24. Clamp assembly 24 includes a lower base 45, an upper clamp blade 46 and an air-actuated clamp mechanism 47 which closes the blade 46 onto the base 45.

The base 45 consists of a rubber pad 48 attached to an aluminum plate 49 that measures, in one embodiment, approximately 1 inch wide by 8 inches long. The clamp blade 46 consists of a steel blade measuring approximately ½ inch wide by 8 inches long by 2 inches tall. There are serrations 50 on the lower edge of the blade. During the tensioning of the film 21, the outer edges of the film are placed on the rubber pads 48 of the various clamp assemblies 24 with the clamp blades 46 in a raised and open condition. The clamp mechanisms 47 are then pneumatically actuated and closed causing the corresponding clamp blades 46 to lower onto and grip the corresponding peripheral edge portion of the film. The film is then tensioned by actuating the air cylinders Each clamp mechanism 47 includes an interconnected linkage 51 and a pneumatic cylinder 52. In a manner typical for all clamp assemblies 24, cylinder 52 is anchored to bracket frame 44 and the piston arm 52a of the cylinder is attached to link 51a. By an arrangement of pivot connections between the various members and links of linkage 51, extension of arm 52a lowers blade 46 into a clamping orientation. Retraction of piston arm 52a raises blade 46 off of base 45 so as to release the clamping force on the film edge.

Initial tensioning of a new panel of film requires some trial and error and frequent checking in order to get the proper and desired tension in the film. The tension in the film throughout the stretching step is continually monitored by a tensionmeter placed on the surface of the film. Since the group of cylinders along edges 38 and 39 are all interconnected, tension in the machine direction is evenly distributed at each of the clamp assemblies and the air pressure applied to each air cylinder of this group is the same. Similarly the group of cylinders along film peripheral edges 36 and 37 are all interconnected and the tension in the transverse direction is evenly distributed at each of the clamp assemblies. Likewise the air pressure applied to each cylinder of this second group is the same.

In order to create a uniformly tensioned film throughout the entire surface area of the film, the actual air pressure used for one group of cylinders will be different than the air pressure used for the other group of cylinders so long as the film exhibits the directional properties of the currently extruded film. In any event, once the initial film panel is properly tensioned, the pressure used for each group cylinders can be determined. Thereafter repetitive tensioning of successive film panels is performed by merely opening the control valve on each regulator 30 and 31 which have been preset to the correct air pressure as predetermined for the first film panel. Once the film is correctly tensioned the next step is to bond the stretched film to the mirror frame. The mirror frame is circular and is schematically represented in FIG. 1 by the broken circular lines 40.

Figure 3:
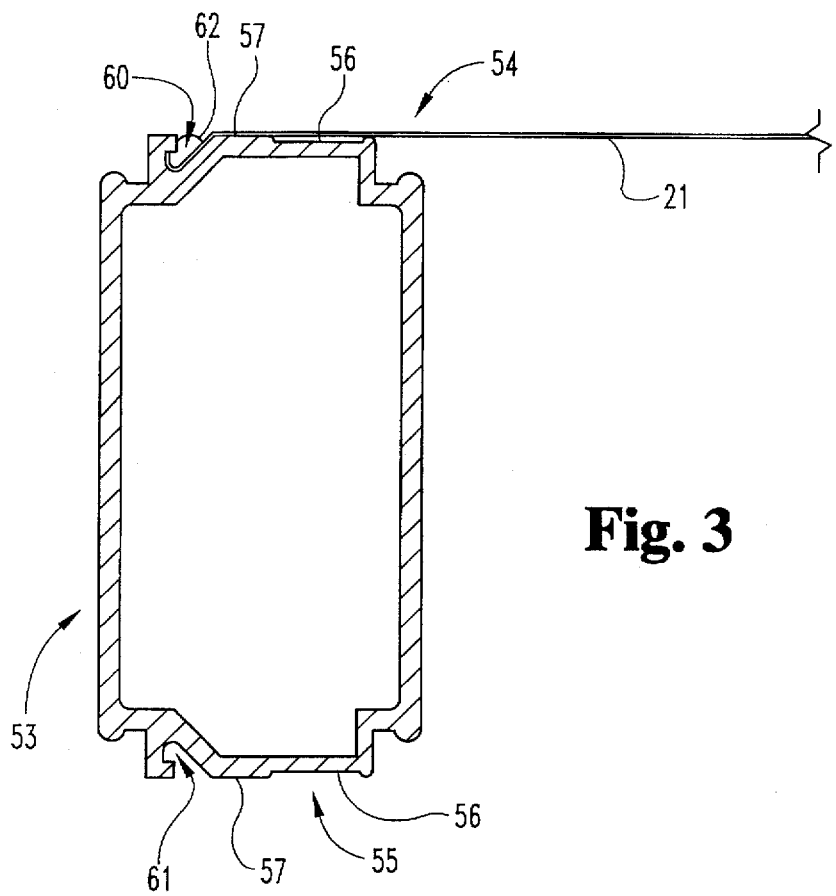
FIG. 3 is a side elevational view ill full section of one side wall of a mirror frame to which the tensioned reflective film is adhesively attached according to a typical embodiment of the present invention.

Referring to FIG. 3 the details of the mirror frame 53 are illustrated. FIG. 3 is a side elevational view, in full section, of one side wall of mirror frame 53 and as illustrated mirror frame 53 includes virtually identical top and bottoms surfaces 54 and 55, respectively. Mirror frame 53 is circular and is smaller in diameter than the width and length dimensions of film panel 21. Frame 53 is hollow and generally rectangular in lateral cross section. Top surface 54 includes two substantially flat plateau areas 56 and 57 which are used respectively for a structural adhesive and for a cyanoacrylate glue. In the FIG. 3 illustration the edge of film 21 is shown in its final configuration. However, the film is still in the tensioning fixture when it is initially bonded to plateau areas 56 and 57 on the mirror frame.

The bonding-of the film to the mirror frame is by means of a two-part or two-stage adhesive. While the film is being tensioned and still in tensioning fixture 20, a bead of structural adhesive is applied along the entire circumference of the mirror frame on plateau area 56. Similarly, a bead of cyanoacrylate glue is applied along the entire circumference of the mirror frame on plateau area 57. The cyanoacrylate glue is designed to immediately bond the film to the mirror frame in order to permit relatively quick removal of the film tensioning fixture 20 so that it may be used to stretch and mount successive film panels. The structural adhesive is designed for the long term and typically has a cure time of several hours. The cyanoacrylate glue holds the film firmly to the mirror frame throughout the curing process of the structural adhesive.

There are various ways to mount and fixture the mirror frame relative to the tensioning fixture 20. One option is to use two tensioning fixtures 20, one on each side of the mirror-frame, and attach the lower film panel 21 on the underside of the mirror frame 53 first. After tensioning the top film panel 21, the top tensioning fixture, hinged to an outer structural support, is lifted up-and away from the mirror frame. The adhesives are then applied to the top surface 54 of the mirror frame 53 and the top tensioning fixture is then lowered back onto the mirror frame.

If the hinged arrangement is not used, it is still possible to use separate tensioning fixtures 20. In this configuration one film panel is tensioned and bonded to its corresponding surface of the mirror frame 53. After the first film panel 21 is bonded to one surface of the mirror frame 53, for example the top surface 54, but still before the tensioning fixture 20 is removed and subsequent forces are applied to the mirror frame, the entire assembly process is repeated for the opposite side of the mirror frame. A second tensioning fixture may be provided for this purpose and a second film panel is mounted into that tensioning fixture which is positioned in a operable fashion relative to the opposite side (surface 55) of the mirror frame 53. The aforementioned and described tensioning process is then repeated. After the two reflective film panels are attached to their corresponding opposite sides surfaces of the mirror frame, the two tensioning fixtures are removed. The film panels are trimmed and the free edges tucked into channel 60 in the top surface 54 and into channel 61 in the bottom surface 55 for the FIG. 3 adhesive configuration. Each of these two channels is then filled with a bead of a silicone-based sealant 62.

Figure 11:
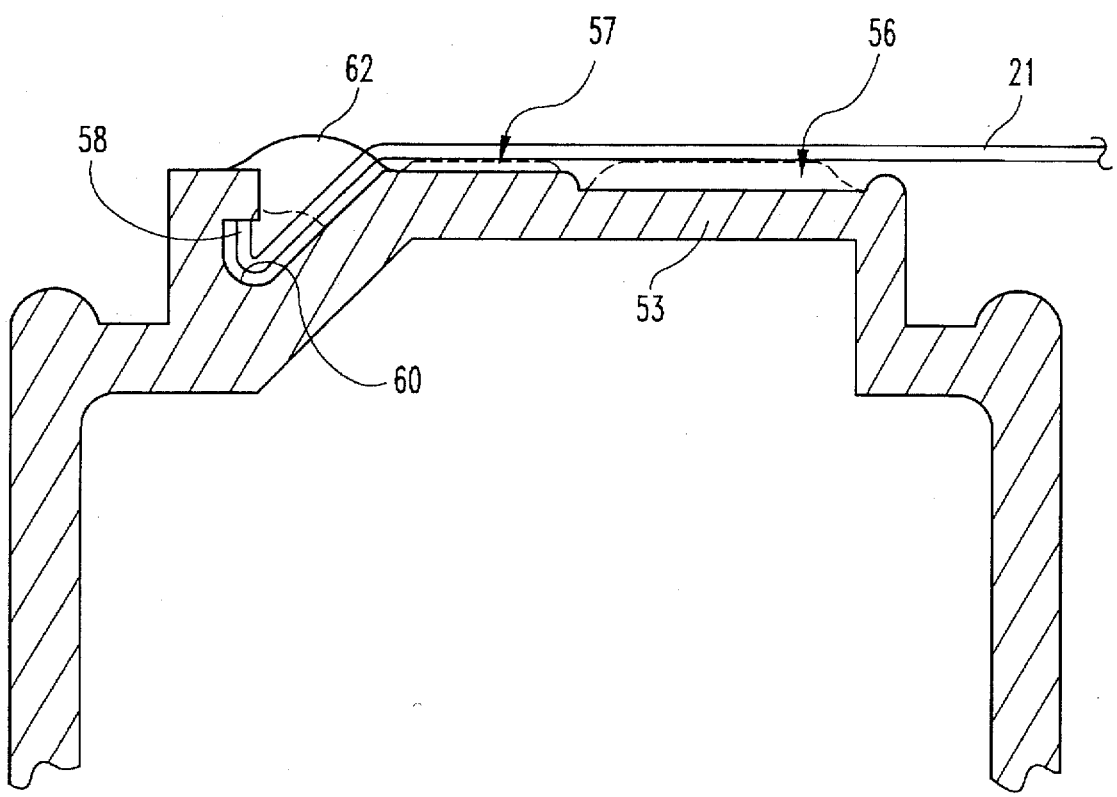
FIG. 11 is a side elevational view in full section of one side wall of a mirror frame to which the tensioned reflective film is adhesively attached according to a typical embodiment of the present invention.

Referring to FIG. 11 there is illustrated an assembly variation for securing the film panel 21 to the mirror frame 53. Although the structure of mirror frame 53 in FIG. 11 is the same as that of FIG. 3, the locations of the two adhesives are different. In FIG. 11 the entire circumference of the mirror frame on both plateau areas 56 and 57 receives a layer, of cyanoacrylate adhesive (broken line). The trimmed edge 58 of the first film panel 21 is tucked into channel 60 which in one embodiment is then coated with a thickness of the structural adhesive (broken line). The effect is to encapsulate the-film edge 58 within channel 60 with the structural adhesive. The top opening of the channel is then sealed closed with the silicone-based sealant 62. In another though closely related embodiment the structure adhesive is not used and the entire channel 60 is filled with sealant 62.

Figure 4:
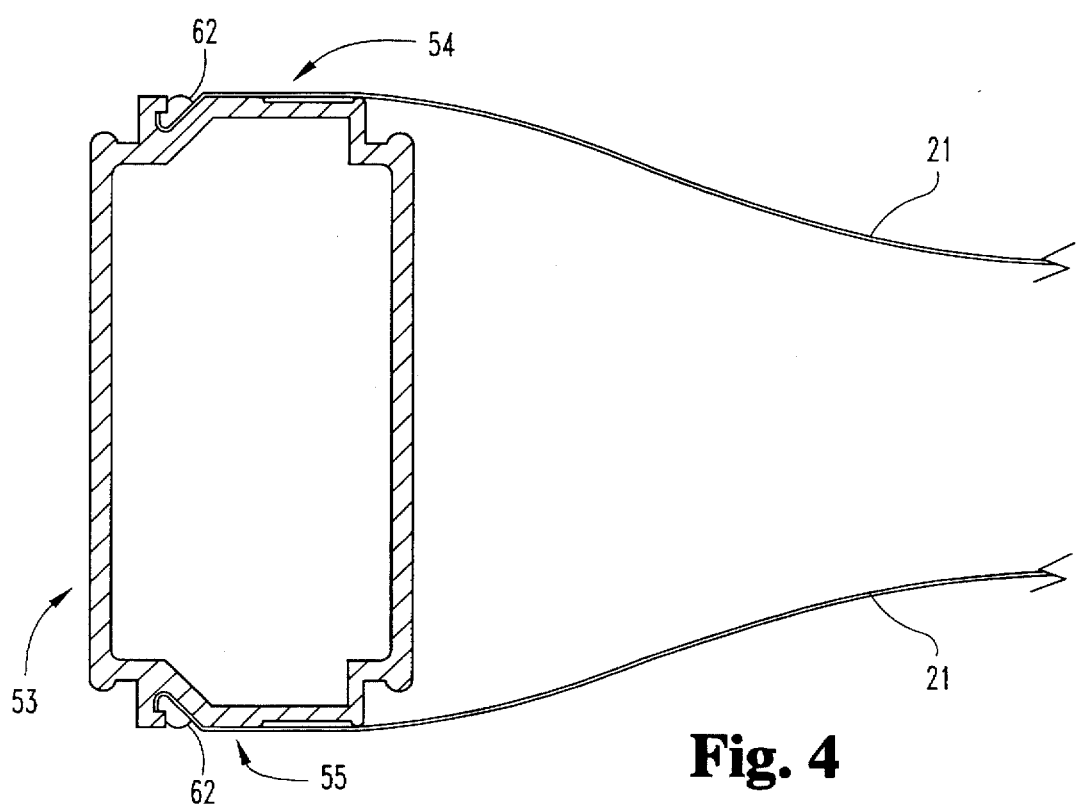
FIG. 4 is a partial, side elevational view in full section of the FIG. 3 mirror frame after two reflective film panels are attached and a vacuum is pulled on the interior space to create a parabolic-shaped surface.

After the mirror frame is completely assembled with the two reflective film panels and after the glue and adhesive have fully cured, a vacuum is pulled on the volume disposed between the two film panels on the interior of the mirror frame. The vacuum can be drawn by means of a resealable aperture through the side wall of the frame. The vacuum creates a parabolic curvature in the film panels allowing either side to be used as a parabolic reflective mirror. The film which is used is a metallized (either aluminum or silver) polyester with a protective coating applied to the metal. The finished dimension of the mirror is approximately a 60 inches in diameter. The parabolic surface of the reflective film (mirror) has an approximate f/D of 3.5 and the depth of the parabolic curve is approximately 1.07 inches. The parabolic curvature of the two film panels which are fabricated to opposite sides of the mirror frame is illustrated in partial side elevational form FIG. 4.

Figure 5:
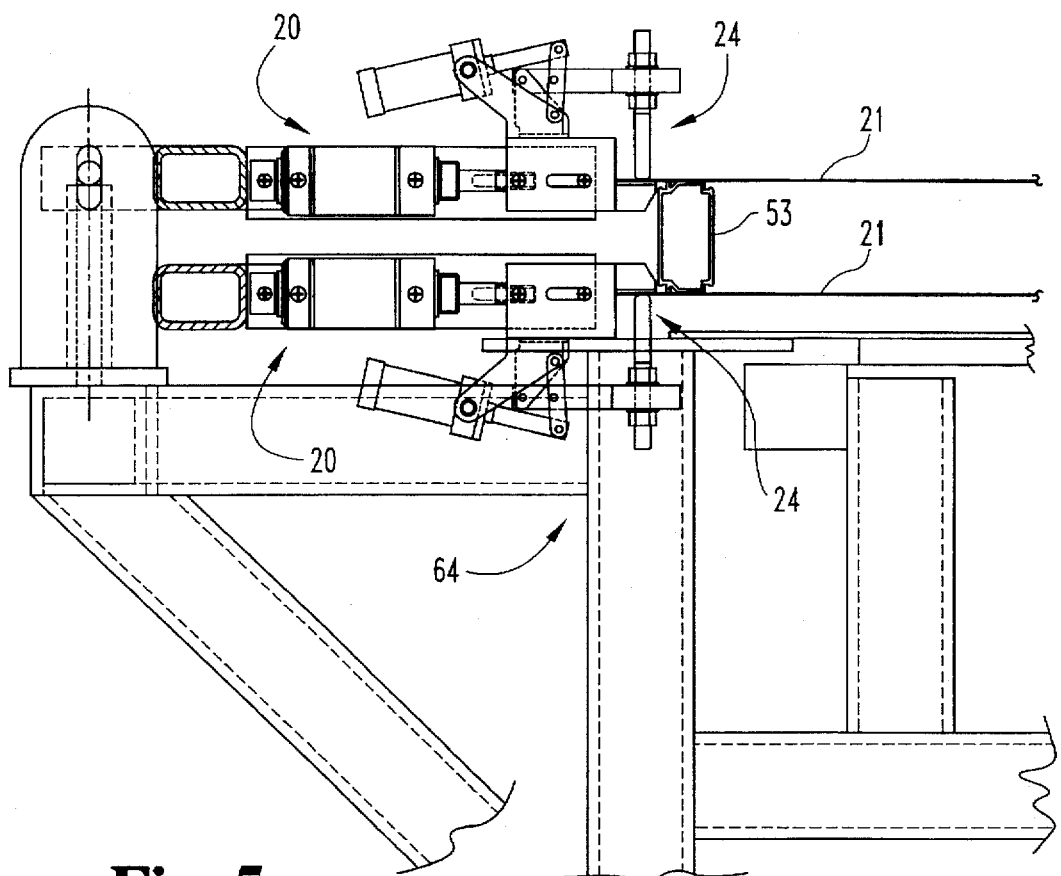
FIG. 5 is a schematic side elevational view of a support structure and hinge arrangement for the FIG. 1 film tensioning fixture.

Referring to FIG. 5 the details of one possible dual tensioning fixture, hinge and support structure arrangement are schematically illustrated. Tensioning fixtures 20 are oriented in parallel to each other on opposite sides of mirror frame 53. While only one side of the total arrangement is illustrated, it is to be understood that each such clamping location will appear in a virtually identical fashion. In the schematic illustration of FIG. 5, two film panels 21 are present and are arranged in a substantially parallel manner on opposite sides of the mirror frame 53. Each film panel 21 is in a clamped condition by means of the corresponding clamp assembly 24. Superstructure 64 provides an arrangement of support members to which the upper and lower tensioning fixtures are attached or at least retained. The upper tensioning fixture 20 is hinged to superstructure 64 and in this hinged configuration is provided with suitable counter balance weighting so that once raised, the fixture will stay in that position until manually lowered.

One method of using the arrangement of FIG. 5 begins with the two film panels 21 and the mirror frame 53 removed. The first step is to load the lower film panel into the corresponding tensioning fixture and operate the clamping cylinders and the tensioning cylinders. A support fixture disposed within the rectangular frame and beneath the film panel may be used to assist with this initial step in order to hold up and support the center of the film panel until it is properly tensioned.

The next step is to apply the two adhesives to the lower surface 55 of the mirror frame 53 and to place the mirror frame onto the tensioned film panel 21. Once the adhesive sets up and the lower film panel is trimmed and securely attached to the mirror frame, the process continues with the upper film panel. The first step is to load the film panel 21 into the upper tensioning fixture 20 and draw the desired tension on the film. The next step is to raise the tensioning fixture 20 and the tensioned film 21 up and away from the mirror frame 53 by means of the hinged connection of fixture 20 to superstructure 64. The two adhesives are then applied to the upper surface 54 of the mirror frame 53 and the raised fixture is then lowered into position. Additional downward force, to be described hereinafter, may be applied to the tensioning fixture in order to aid in the adhesive bonding process of the film panel to the mirror frame.

If it is desired to fabricate the parabolic reflector of the present invention using only a single tensioning fixture 20, then the FIG. 5 illustration will be-applicable, but without the lower tensioning fixture in place. When only one fixture is used the first step is to place the film panel in position and clamp it into the corresponding tensioning fixture 20. The next step is to properly tension the film to the desired level. After the tensioning step, the tensioning fixture and film panel are raised and the mirror frame is placed onto a support structure. In the next step the two adhesives are applied (FIG. 3 version) and then the tensioning fixture and film panel are lowered onto the mirror frame. Once the cyanoacrylate adhesive cures, the clamp assemblies are released and the film is trimmed and the assembly process completed. Once this assembly has been completed, the mirror and first film panel are turned over and the process is repeated for the opposite side of the mirror frame 53 using the same tensioning fixture 20.

Figure 6:
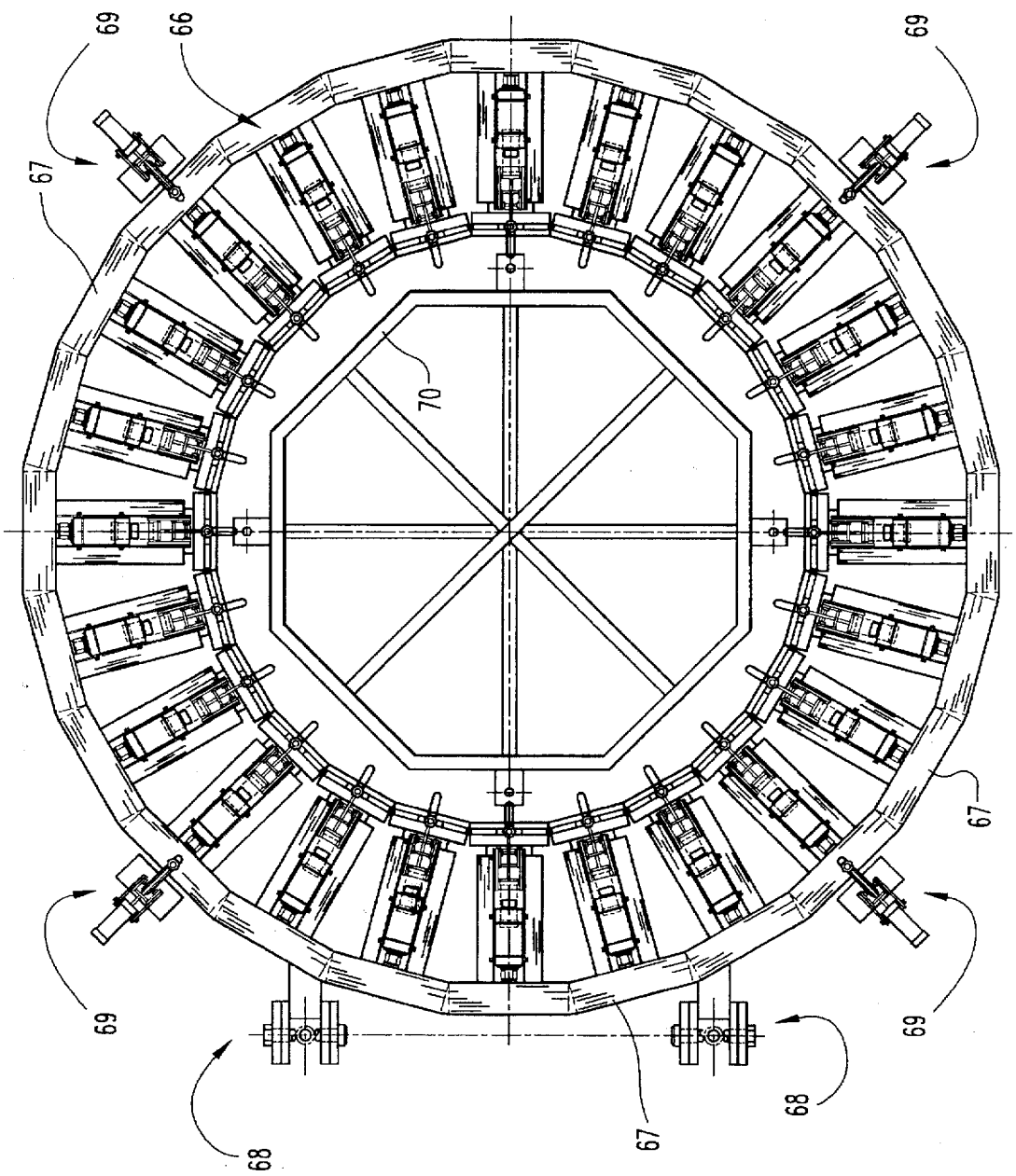
FIG. 6 is a schematic top plan view of an alternative film tensioning fixture according to a typical embodiment of the present invention including the FIG. 5 hinge arrangement.

Referring to FIG. 6 the generally rectangular support frame 22 is replaced by a generally circular support frame 66. Frame 66 is a weldment consisting of 24 sections 67 each of a hollow, generally rectangular aluminum tubing. The ends of each section 67 are cut at an angle so that the end-to-end abutment of the 24 sections will create the generally circular support frame 66.

It is to be understood that there are a total of 24 clamp assemblies 24 (as detailed in FIG. 2) each of which are virtually identical. As has been previously described, each clamp assembly is attached at one end to the frame 66 (or frame 22) and at the opposite end to the edge of the film panel. Whether a generally circular support frame (frame 66), or a generally rectangularly support frame (frame 22) is used, the mirror frame is radially inside of the support frame. The number and arrangement of clamping assemblies 24 as well as cylinders 23 is somewhat arbitrary as described, but the teachings of this invention regarding this arrangement and use of the pressure regulators remains the same regardless of the support frame shape.

There may be a separate frame as well as a separate grouping of 24 cylinder-clamp assemblies for each panel of film, one on top of the mirror frame and one on the bottom or underside of the mirror frame, as has been described as one option for the present invention. In order to load the mirror frame into position beneath the top support frame, the support frame is hinged, as previously described. The two hinge structures are identified as hinges 68. The spaced-apart pair of hinges 68 are attached to a main support base or superstructure 64. These hinges are effective to enable the top support frame 66 to be manually raised providing clearance for the mirror frame to be positioned between the top and bottom film panels or for the mirror frame and film panel to be turned over if only one tensioning fixture is used. Octagonal frame 70 is provided in order to support the center portion of the film panel prior to tensioning.

Four equally-spaced clamp assembly 69 are positioned around the support frame 66 as illustrated. Each of these four clamp assemblies includes an air-actuated cylinder 69a which is used to push down on support frame 66 in order to enhance the adhesive bonding of the film panel 21 to the mirror frame 53. One of these four clamp assemblies 69 is illustrated in FIG. 7.

Figure 7:
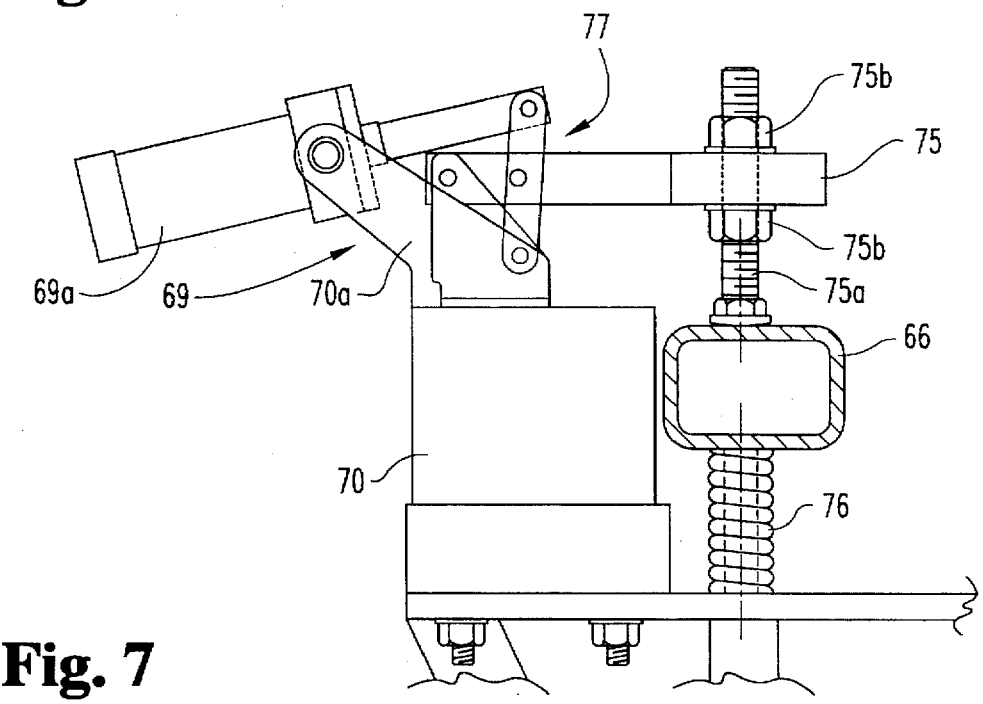
FIG. 7 is a perspective view of a clamping linkage used to provide additional force for bonding the film to the mirror frame as part of the present invention.

Referring to FIG. 7 clamp assembly 69 is illustrated in greater detail and includes a supporting base 70 which is rigidly connected to bracket 70a which is in turn is pivotally connected to the outer body of cylinder 69a. Pivot arm 75 includes a bolt 75a which is adjustably anchored to arm 75 by hex nuts 75b. Adjustment of nuts 75b permits the force on support frame 66 exerted by the head of the bolt 75a to be adjusted without having to change any of the linkage members. Support spring 76 provides tensioned adjustability so that dimensional and alignment variations between the four locations of the clamp assemblies can be balanced for uniform tensioning. Linkage 77 interconnects arm 75 with cylinder 69a so that actuation of the cylinder to retract the piston arm creates a combined pivoting and lifting action on bolt 75a. When the piston arm is extended from its retracted position the bolt 75a which is then in a raised, outwardly pivoted position, moves into position over support frame 66 and is lowered so as to apply a downward force on the frame. The linkage 77 creates this entire path of motion in a single move by one stroke of the cylinder piston arm, either a retracting stroke to take bolt 75a out of engagement with support frame 66 or by an extending stroke of the piston arm to lower bolt 75a onto support frame 66.

Figure 8:
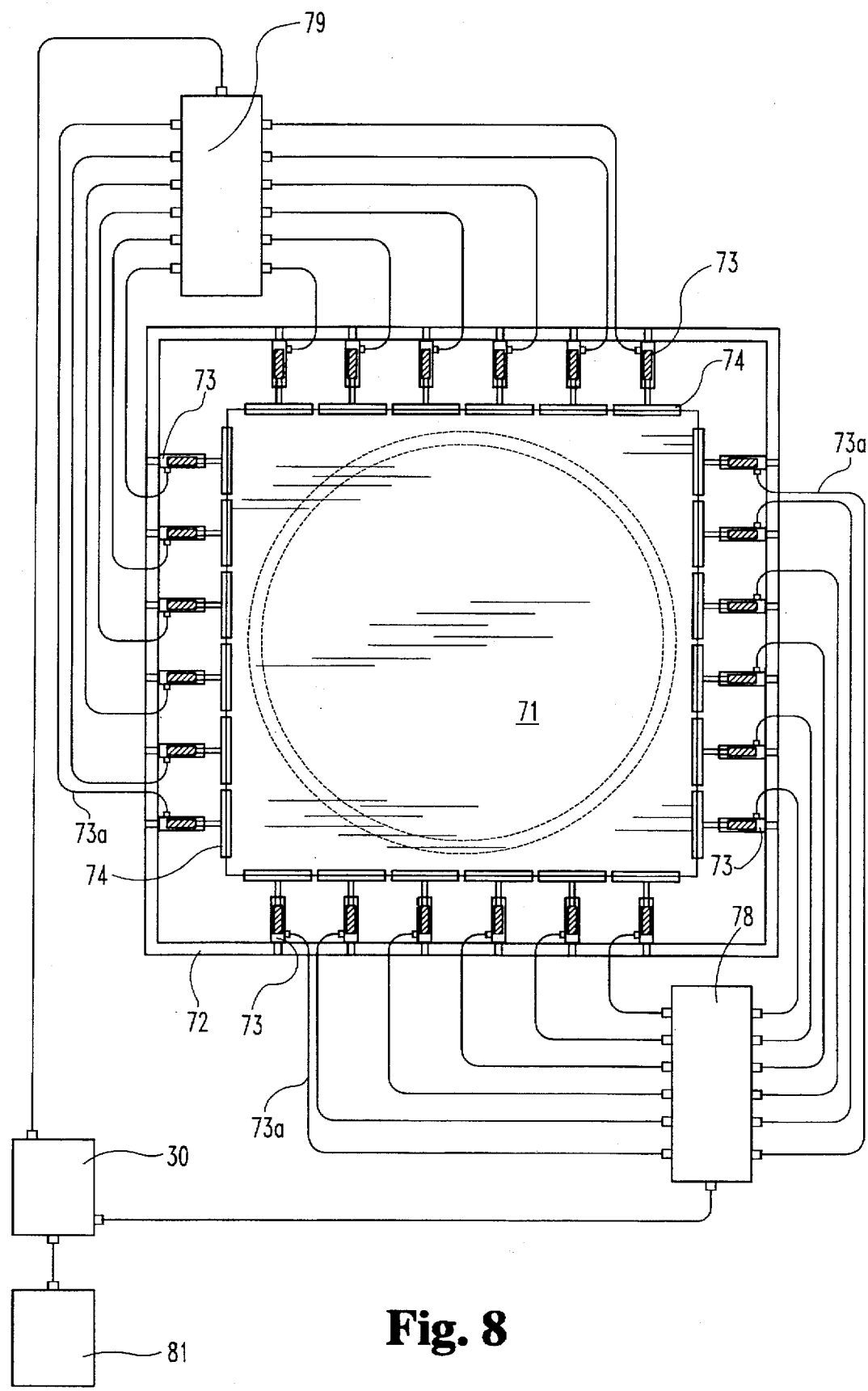
FIG. 8 is a schematic top plan view of an alternative tensioning fixture according to a typical embodiment of the present invention.

Referring to FIGS. 8, 9A, 9B and 10, alternative arrangements for the present invention are illustrated. The parabolic mirror which results from the aforementioned manufacturing process will typically be circular in peripheral shape. However, the tensioning fixture need not be rectangular as has been described for tensioning fixture 20. The number and arrangement of regulators is also a variable depending upon variations in the grain or fiber structure of the film panel which is to be stretched in order to create the reflective parabolic mirror. When the film panel is square or rectangular and is formed from an extruding process, the machine direction and transverse direction of the film exhibit different tensioning behaviors. This is why the FIG. 1 arrangement uses two regulators, a different regulator for each direction, so as to independently control the different air pressures required for each group of air cylinders associated with the two different film directions. However, if the machine direction and transverse direction of the film do not exhibit any different tensioning behavior, such that the tensioning pressure is the same for all four sides of the film, then a single regulator will be sufficient. This single regulator design is illustrated in FIG. 8 wherein the tensioning fixture for stretching film 71 includes a rectangular frame 72. The air cylinders 73 which are attached between the clamp assemblies 74 and the frame 72 are identical and are all interconnected by air lines 73a to a first manifold 78 and a second manifold 79 which are in turn connected to a single pressure regulator 80 and then to a single compressor 81. The tensioning fixture of FIG. 8 is used and performs in a manner virtually identical to tensioning fixture 20, except that the pressure to the air cylinders is the same and the tensioning in all four directions is the same. For this reason the groups of cylinders can be grouped and interconnected in any desired manner with any number of manifolds.

Since the end device which is created from this manufacturing method is a circular, parabolic-surface mirror, beginning with a circular panel of film and using a circular tensioning fixture may be the most efficient and accurate arrangement. Consider also that if the film is made by an extrusion process, the directional nature of the film, i.e., different tensioning in the machine direction versus the transverse direction, may create slight tension irregularities along the diagonal corner lines, especially when a rectangular or square panel of film is bonded to a circular mirror frame. In order to tension the circular film in a uniform manner in all radial directions when the film is produced from an extrusion process, a circular tensioning fixture may be essential.

Figure 9A:
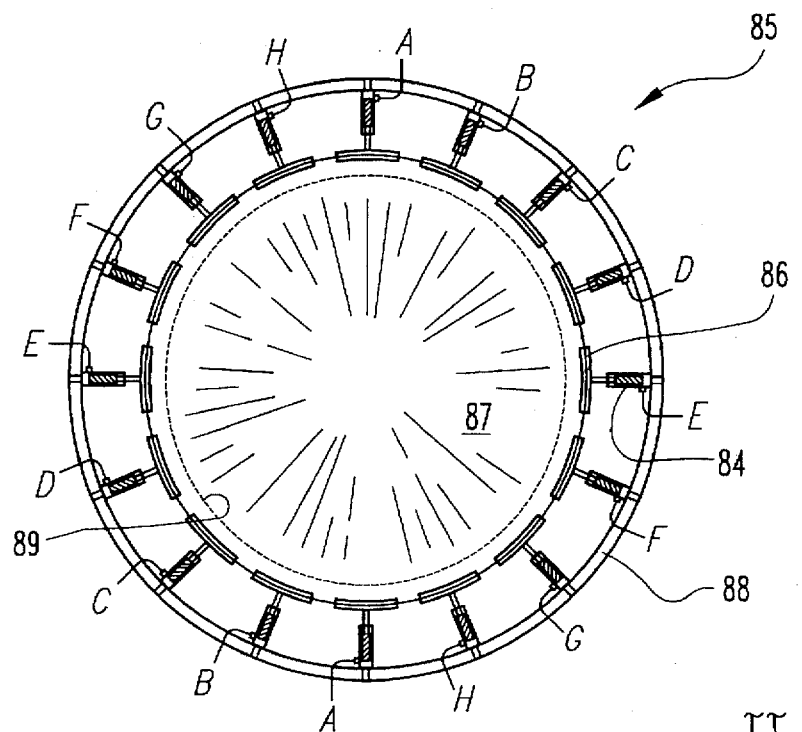
FIG. 9A is a schematic top plan view of a circular tensioning fixture according to the present invention.
Figure 9B:
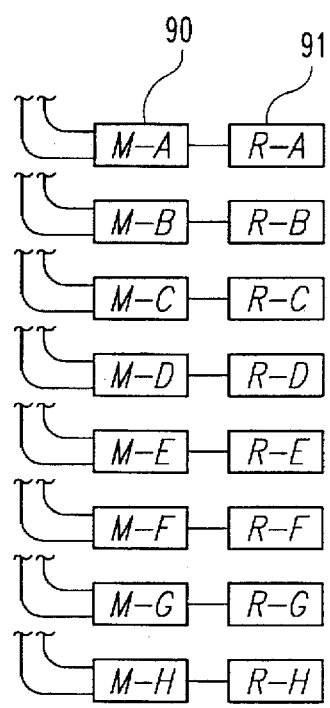
FIG. 9B is a schematic illustration of an arrangement of manifolds and regulators for use with the FIG. 9A fixture.

Referring to FIGS. 9A and 9B a circular tensioning fixture 85 is illustrated as would be arranged for practicing the present invention. Fixture 85 includes, as one of several variations, sixteen clamp assemblies 86 attached to circular film panel 87 and sixteen air-actuated cylinders 84 connecting the clamp assemblies 86 to the circular fixture frame 88. The interior circular broken line 89 represents the mirror frame. The design and operation of the clamp assemblies and air cylinders is virtually identical to that described for tensioning fixtures 20 and 70, with one exception. Each clamp assembly pad, plate and blade are curved so as to match the arc curvature of the film's peripheral edge. For a 60 inch diameter panel of film, for example, and assuming the use of sixteen clamps, the curved length of each pad, plate and blade would need to be in the range of 10 to 11 inches. These dimensions would create a near full, circumference clamping with only very slight clearance left between adjacent clamping assemblies. The clamp assemblies (and corresponding cylinders) are arranged in pairs evenly and equally spaced 180 degrees apart and the pair combinations are identified as A through H. The corresponding manifolds 90 and regulators 91 have an "M" and "R" prefix, respectively.

If the circular panel of film is cut from a sheet of film which is produced by an extrusion process, then the aforementioned tensioning differences between the machine direction of the film and the transverse direction of the film will exist. However, with a circular panel of film the tensioning is not limited to directions which are parallel to the machine direction and to the transverse direction. While tensioning by the two E clamp assemblies may correspond to the machine direction, and while the two A clamp assemblies may correspond to the transverse direction, the remaining pairs of clamp assemblies will tension the film according to some combination of the machine direction and transverse direction properties. It is also possible to combine clamp assembly/cylinder pairs B and H with one regulator, pairs C and G with one regulator and pairs D and F with one regulator, if the film material properties are symmetrical on opposite sides of the centerline from one clamp assembly/ cylinder A to the opposite clamp assembly/cylinder A. However, if there is a concern about the symmetry of the film material properties the safest approach is to use a separate regulator for each opposing clamp assembly/ cylinder pair. This way if there is any tensioning variation due to the film properties along those specific directions of tensioning, the individual pressure regulators will be able to accommodate pressure variations in order to achieve a uniform tension across the entire film surface. If the film exhibits uniform properties such that tensioning by clamp assembly pairs B and H require the same pressure, then a single pressure, regulator could be used. Likewise, if clamp assembly pairs C and G require the same pressure a single regulator could be used with those four cylinders. The same is true for clamp assembly pairs D and F, so long as the nature of the film is such that these four cylinders continue to require the same pressure.

It is also to be understood that the number of clamp assembly pairs can change. It is necessary to have pairs of clamp assemblies and to have them evenly spaced around the circumference of the film. It is also necessary for the arc length of the clamps to be such that nearly the entire circumferential edge of the film is clamped, allowing only a slight clearance spacing between adjacent clamp assemblies.

Figure 10:
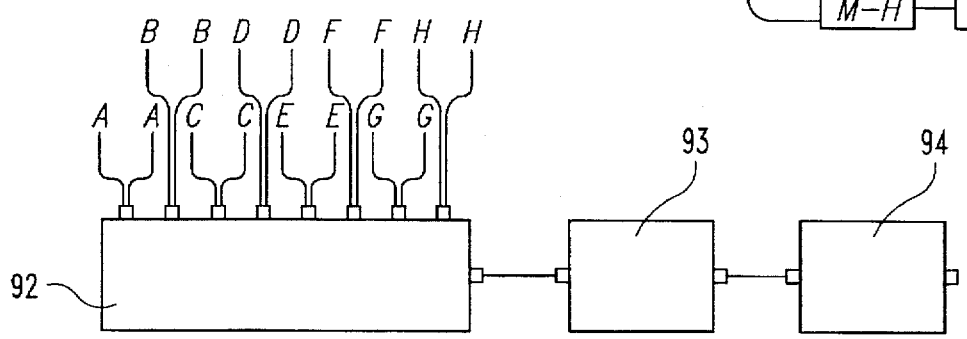
FIG. 10 is a schematic illustration of an alternative air cylinder and regulator arrangement for the FIG. 6 circular tensioning fixture.

If the manufacture of the reflective film is not accomplished by an extrusion process and if the material used for the film, regardless of its composition or method of manufacture, exhibits tensioning uniformity in all directions, then a single regulator could be used for all of the air-actuated cylinders. This particular single regulator arrangement is illustrated in schematic form in FIG. 10. FIG. 10 is an illustration of how the FIG. 9 tensioning fixture would be reconfigured if the film exhibited tensioning uniformity in all radial directions. The remainder of the tensioning fixture and frame of FIG. 9 are not illustrated in FIG. 10 as these are identical. Instead, only the air lines for clamp assembly pairs A through H are illustrated and their connection to the same manifold 92 which is in turn connected to a single pressure regulator 93 and from there to a single air compressor 94. This alternative arrangement will thus introduce the same air pressure to all cylinders and the tensioning force will be applied uniformly in all radial directions. Assuming that the film responds uniformly to this tensioning, then the entirety of the film will be at the same tension.

Throughout this specification two representative configurations for a film tensioning fixture have been described and analyzed. These include the rectangular configuration of FIGS. 1 and 8 and the circular configuration of FIGS. 6 and 9. Also analyzed throughout this specification is the topic of uniformity of the film material properties and the symmetry or orientation pattern of differing properties relative to the machine direction and the transverse direction of the film. The nature and pattern of the anisotropy of film properties affects the number of pressure regulators. While the number of clamp assemblies depends primarily on the size of the clamp blades and the perimeter size of the sheet or panel of film, the number of regulators required depends on the anisotropy of film properties.

It is important to apply tensioning forces at a plurality of closely spaced locations around the entire periphery of the panel of film and as should be understood there is a practical limit to the size of the clamp blades which could be used in order to get uniform and balanced clamping pressure across their entire surface area. When these factors are reconciled for any particular panel of film, the number of clamp assemblies needed can generally be derived. The number of regulators depends on the anisotropy of film properties and the pattern from edge to edge throughout the panel of film. We know that there should be a uniform pattern of clamp assemblies and a certain symmetry of clamp assembly pairs connected to their corresponding cylinders. By lining up the clamp assemblies in diametrically opposed pairs, the maximum number of regulators that would ever be needed will equal one half of the total number of cylinders. As specific tensioning directions diametrically opposite to one another across the film have an identical pattern of film properties (primarily the response to tensioning), the corresponding clamp assembly and cylinder combination pairs can be connected to a common regulator.

As described with regard to the FIG. 1 embodiment, two regulators were used as it was assumed that the material properties were virtually identical across the width of the film in the machine direction and virtually identical across the length of the film in the transverse direction. In the FIG. 8 arrangement it is assumed that the entire panel of film does not exhibit any anisotropy in material properties and thus a single regulator is sufficient as the tensioning forces on each clamp assembly are virtually identical and thus the same air pressure on each cylinder. The foregoing discussion is important as the type and nature of film to be used in the present invention may vary and to anticipate possible changes and advances in film material and process techniques in the future.

With regard to the Blumentritt theory as reported in the *Journal of Applied Polymer Science*, he concludes that when the film is drawn uniaxially during its manufacture, the c-axis of the polymer crystal, which is the polymer chain axis, tends to align along the stretching direction. When the film is then drawn in the transverse direction, oriented regions in the film fan out from the machine direction toward the transverse direction, with the degree of transverse orientation increasing with the distance from the center of the web, and the c-axes distribute themselves accordingly. The variation in orientation across a film web is the primary cause of an anisotropy of film properties. Blumentritt goes on to note that because of variations in the degree crystallinity and orientation of crystalline and noncrystalline regions of film, the properties of PET film vary with location in a roll of film and also from one roll of film to another. According to Blumentritt, while mechanical properties such as Young's Modulus, yield stress, ultimate strength, and ultimate elongation have been published by film manufacturers, only properties in the machine or machine and transverse directions are given. He goes on to note that while other researchers have determined mechanical properties of several PET films and have found that biaxially oriented PET films exhibit significant anisotropy in modulus, ultimate strength and ultimate elongation, they have found that yield stress of these films is essentially anisotropic.

The practical consequences of the Blumentritt theory to the present invention involves the number of regulators required to create a uniformally tensioned panel of film which will create the desired focal spot once pulled into a parabolic shape by the application of a vacuum to the back side of the stretched film. A careful study of the Blumentritt article leads to the conclusion of an elliptical pattern in the film properties with the principal orientation direction being generally coincident with the major axis of the ellipse. This elliptical pattern requires different tensioning forces on the clamp assemblies which are positioned between the major and minor axes of the ellipse. Since it is assumed that each quadrant of the ellipse is the same, the number of regulators depends on the number of clamp assemblies arranged between the major and minor axes. If there are five clamp assemblies in each quadrant between the major and minor axes, then a total of five regulators would be required for these locations with one additional regulator for the major axis clamp assemblies and one additional regulator for the minor axis clamp assemblies.

Figure 12:
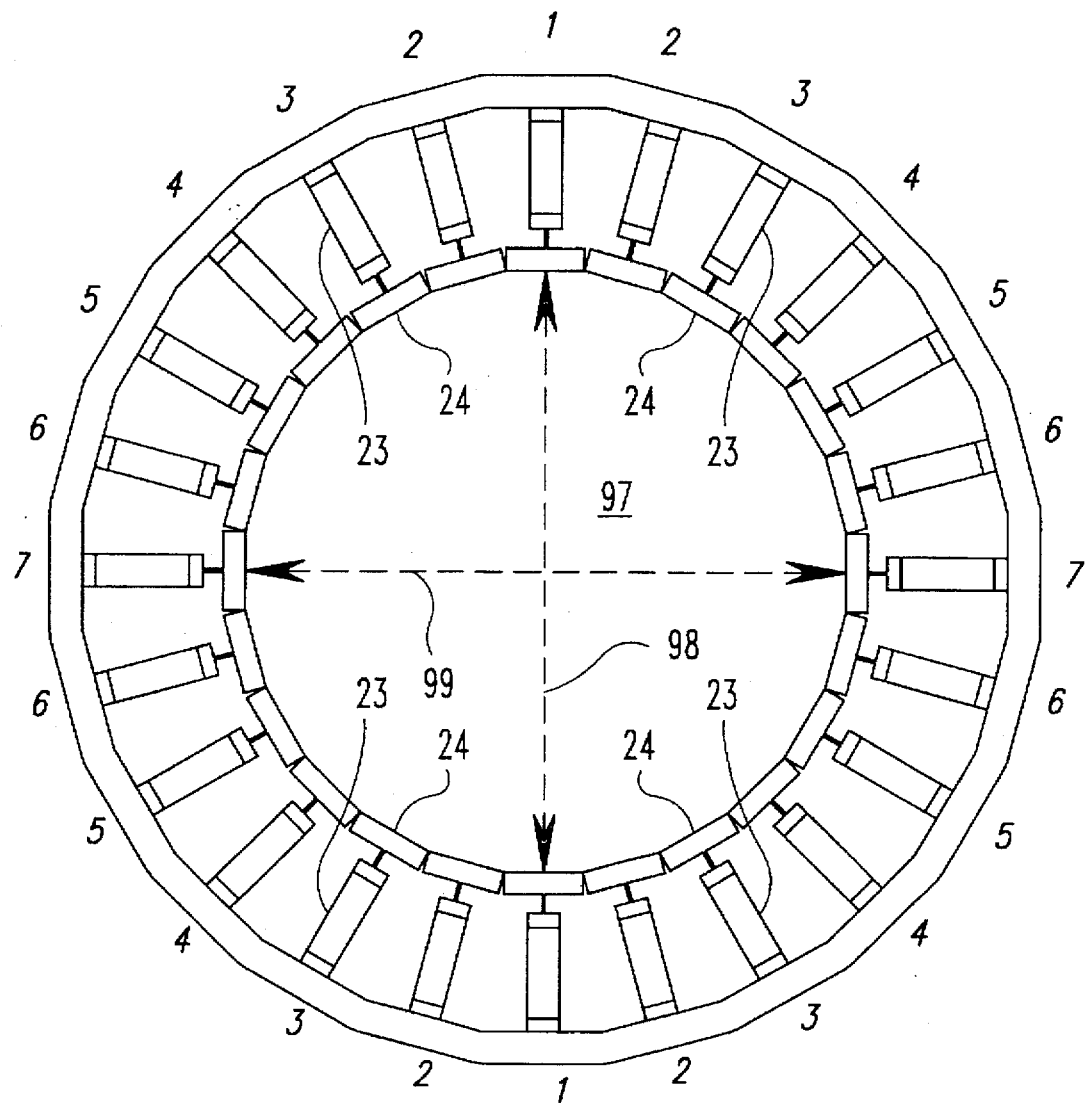
FIG. 12 is a diagrammatic illustration of a clamp assembly and cylinder arrangement representative of a elliptical pattern theory for the film material properties.

Referring to FIG. 12 there is illustrated in diagrammatic form a schematic representation of the arrangement of 24 clamp assemblies 24 and 24 air-actuated cylinders 23 for a generally circular panel of film 97. In film 97 it is assumed that the principal orientation direction is on a line between the transverse and machine directions of the film. The relationship of the principal orientation direction to the transverse direction closely resembles an ellipse. Therefore, if tensioning forces are applied as a function of an ellipse and oriented in such a way that would counteract the mechanical properties of the film, the quality of the stretched membrane mirror could be improved. By using the mathematical equations for an ellipse and applying tensioning pressures to the cylinders which are inversely proportional to the ellipse dimensions, an accurate tensioning pattern for the entire panel of film can be predicted.

In FIG. 12 the 24 clamp assembly/cylinder locations are each numbered and like numbers represent the same tensioning force in terms of the cylinder air pressure in pounds per square inch. The line 98 between locations 1 and 1 corresponds to the major axis of the ellipse and the line 99 between locations 7 and 7 corresponds to the minor axis of the ellipse. One regulator is used for the pair of major axis cylinders and one regulator is used for the pair of minor axis cylinders. Due to the symmetry of an ellipse there are four different locations around the film corresponding to each ellipse location 2, 3, 4, 5 and 6. Thus for the 20 cylinders which correspond to the four sets of five locations, only five regulators are required.

The specific pressure level for each pair of cylinders and for each group of four cylinders can be mathematically approximated by first determining the number of clamp assemblies/cylinders to be positioned between locations 1 and 7 and the desired pressure along the major axis (lowest value). By using the polar equation for the expected ellipse with its pole at the center, and by approximating the ratio of the major axis to the minor axis, and by selecting the pressure desired on the major axis and deciding on the number of cylinder intervals positioned from the major axis to the minor axis, the pressure for each group of four cylinders can be determined. The expected major axis to minor axis ratio can be derived by the methods outlined by Blumentritt.

Now providing some specific numbers, assume for FIG. 12 a major axis pressure level of 30 psi, a major axis to minor axis ratio of 1.32 and six intervals of 15 degrees each from location 1 to location 7, repeated for each quadrant of the ellipse. The requisite pressure along any of the 15 degree interval lines is computed based on the following equation:

$$P_\theta = \sqrt{\frac{1}{\frac{\cos^2\theta}{(P\,\text{major})^2} + \frac{\sin^2\theta}{(P\,\text{minor})^2}}}$$

where

P major=30 psi (arbitrary figure for example only)

P minor=39.6 psi (the inverse of the axis dimensions based upon the ratio)

$\theta$=the degrees from the major axis in 15° increments $P_\theta$=the pressure in psi along the selected $\theta$ line.

The $\theta$ values for cylinder locations 2, 3, 4, 5 and 6, are 15°, 30°, 45°, 60° and 75°, respectively. The pressure levels thus computed for each location of FIG. 12 based upon and assumed major axis pressure of 30 psi and a major axis to minor axis ratio of 1.32 are the following:

| Location | Pressure/psi |
|---|---|
| 1 | 30.000 |
| 2 | 30.438 |
| 3 | 31.738 |
| 4 | 33.818 |
| 5 | 36.369 |
| 6 | 38.651 |
| 7 | 39.600 |

This arrangement of pressure levels is a better approximation of the preferred tensioning pattern based upon the work of Blumentritt. While the values will change as the number of intervals change, the selected pressure along the major axis changes, the major axis to minor axis ratio changes, the polar equation remains valid. This calculation method can be used to position the clamp assemblies and to derive a close approximation of the pressure levels that should give a uniform tension across the stretched film.

If the film being used for the stretched membrane mirror does not exhibit any type of predictable pattern of mechanical properties, whether according to the Blumentritt theory or some other analysis, other techniques may be used to determine the requisite number and appropriate arrangement of regulators and the repeatable pressures. While different film materials may vary greatly in their pattern of mechanical properties, sequential panels of film taken from the same roll should be relatively consistent for 150–200 feet. After this it may be necessary to reassess and readjust each of the pressure levels or the regulator arrangement or both.

If all the assumptions and theories regarding the pattern of material properties in the film are ignored, then one regulator for each diametrically opposed pair of cylinders must be used initially. By using a back side enclosure to seal around the stretched film and to hold a drawn vacuum on the film, the stretched film can be made parabolic prior to permanent attachment to the mirror frame as described herein. With the stretched film in a parabolic contour it is possible to use a light source and to analyze the shape and sharpness of the focal point spot. The pressures apply to each cylinder pair can be individually adjusted until the focal point is a clear and well defined round spot. At this point the pressure readings are taken and the number and arrangement of regulators finalized. Obviously each cylinder with the same or approximately the same pressure level can be grouped and controlled by the same regulator. The ability to group cylinders with the same pressure level to a common regulator is used in connection with the FIG. 12 arrangement, for example.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A stretched membrane mirror comprising:

a mirror frame having oppositely disposed top and bottom surfaces, said top surface of said mirror frame being substantially planar and including two plateau areas and a recessed channel;

a first sheet of reflective film adhesively bonded to said top surface;

a second sheet of reflective film adhesively bonded to said bottom surface;

said frame in combination with said first and second sheets defining a sealed interior volume, said interior volume being at a below atmospheric pressure condition causing said first sheet to assume concave contour; and said first sheet being adhesively bonded to said top surface by two different adhesives, a first adhesive being applied to a first one of said two plateau areas and a second adhesive being applied to a second one of said two plateau areas, said first and second adhesives being different types of adhesive.

2. The stretched membrane mirror of claim 1 wherein one of said two different adhesives is a quick set adhesive and the other adhesive is a structural adhesive.

3. The stretched membrane mirror of claim 2 wherein the outer peripheral edge of said first sheet is inserted into said recessed channel and the remainder of said recessed channel is filled with a sealant.

* * * * *

UNITED STATES PATENT AND TRADEMARK OFFICE
CERTIFICATE OF CORRECTION

PATENT NO : 5,680,262
DATED : October 21, 1997
INVENTOR(S): Patrick K. Soliday, et al.

It is certified that error appears in the above-identified patent and that said Letters Patent is hereby corrected as shown below:

In Col. 3, at line 45, replace "Was" with --was--.

In Col. 4, at line 8, replace "ill" with --in--.

In Col. 6, at line 41, after "cylinders" insert --23--.

Signed and Sealed this

Twenty-third Day of June, 1998

Attest:

BRUCE LEHMAN

*Attesting Officer*　　　*Commissioner of Patents and Trademarks*